R. HUFF.
TRANSMISSION GEARING.
APPLICATION FILED OCT. 25, 1909.

1,075,650.

Patented Oct. 14, 1913.
3 SHEETS—SHEET 1.

R. HUFF.
TRANSMISSION GEARING.
APPLICATION FILED OCT. 25, 1909.

1,075,650.

Patented Oct. 14, 1913.

3 SHEETS—SHEET 2.

Witnesses
J. G. Strickel
J. H. Bruninga

Inventor
Russell Huff
By Foster Freeman Watson & Coit
Attorneys

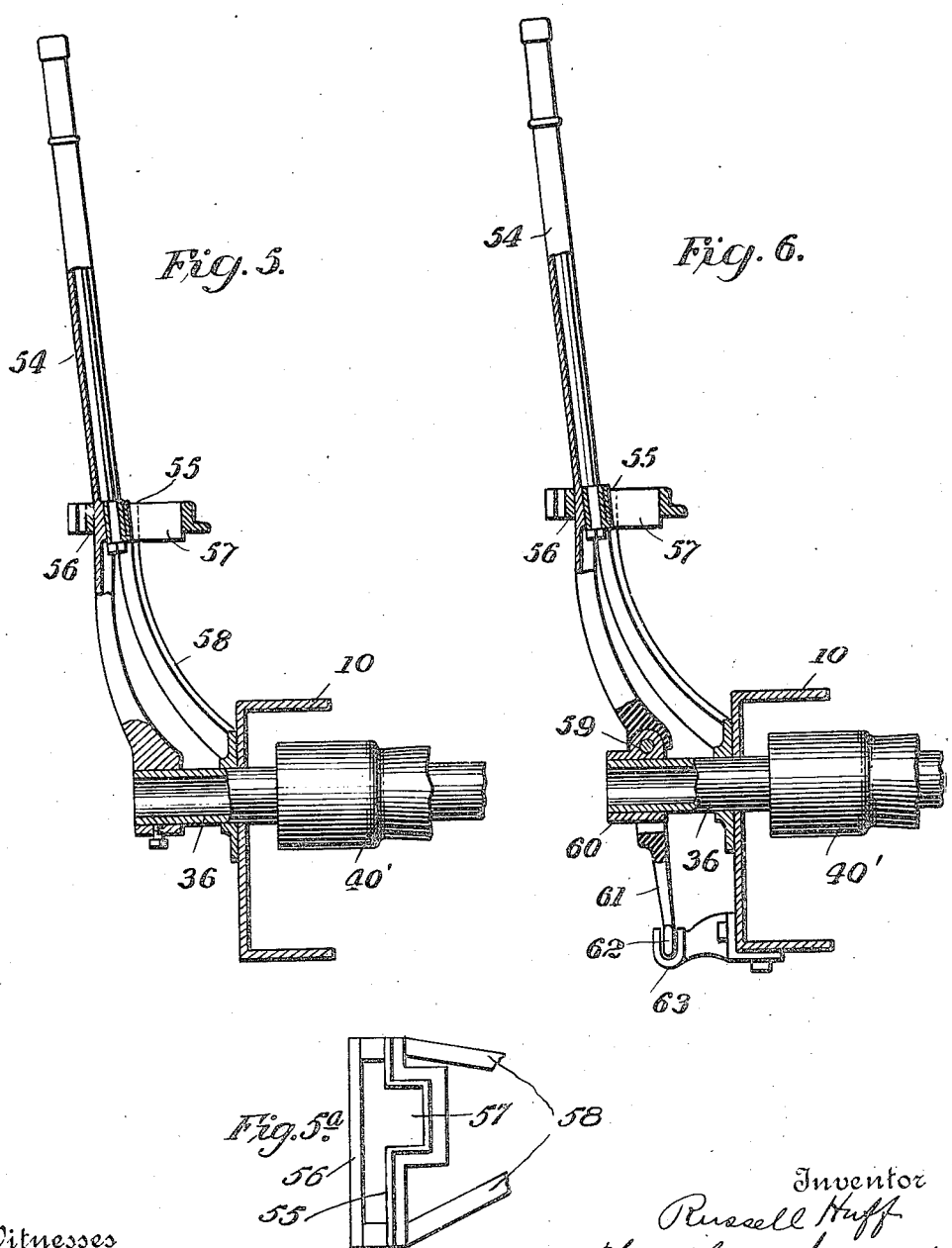

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

TRANSMISSION-GEARING.

1,075,650.  Specification of Letters Patent.  Patented Oct. 14, 1913.

Application filed October 25, 1909. Serial No. 524,461.

*To all whom it may concern:*

Be it known that I, RUSSELL HUFF, a citizen of the United States, and resident of Detroit, Wayne county, State of Michigan, have invented certain new and useful Improvements in Transmission - Gearing, of which the following is a specification.

This invention relates to transmission gearing and the objects are to simplify the construction and arrange the mechanism so that all operating parts are entirely inclosed; to arrange the gearing so that the gear box may be mounted on the frame; and to mount the operating lever directly on a shaft which projects from the gear box or casing, all of the operative mechanism being housed.

The invention generally stated consists in change speed and reverse gearing, a casing inclosing all the said parts, a rocking and an endwise movable shaft projecting from the casing and which rocks to move one of the gears and slides to move another. In this case the shaft rocks to slide the change speed gears and slides to operate the reverse gear. The operating lever moves along and transversely of a guide; in this particular instance it moves along the guide to operate the change speed gears and transversely of the same to operate the reverse gears. The reverse gear is locked in inoperative position during the rotative movement of the shaft in operating the change speed gears so as to prevent breakage. This locking is accomplished both by mechanism inside of the casing and by the construction of the lever guide. The shaft is mounted in anti-friction bearings which allow the shaft to be given both an endwise and a rocking movement.

Figure 1:
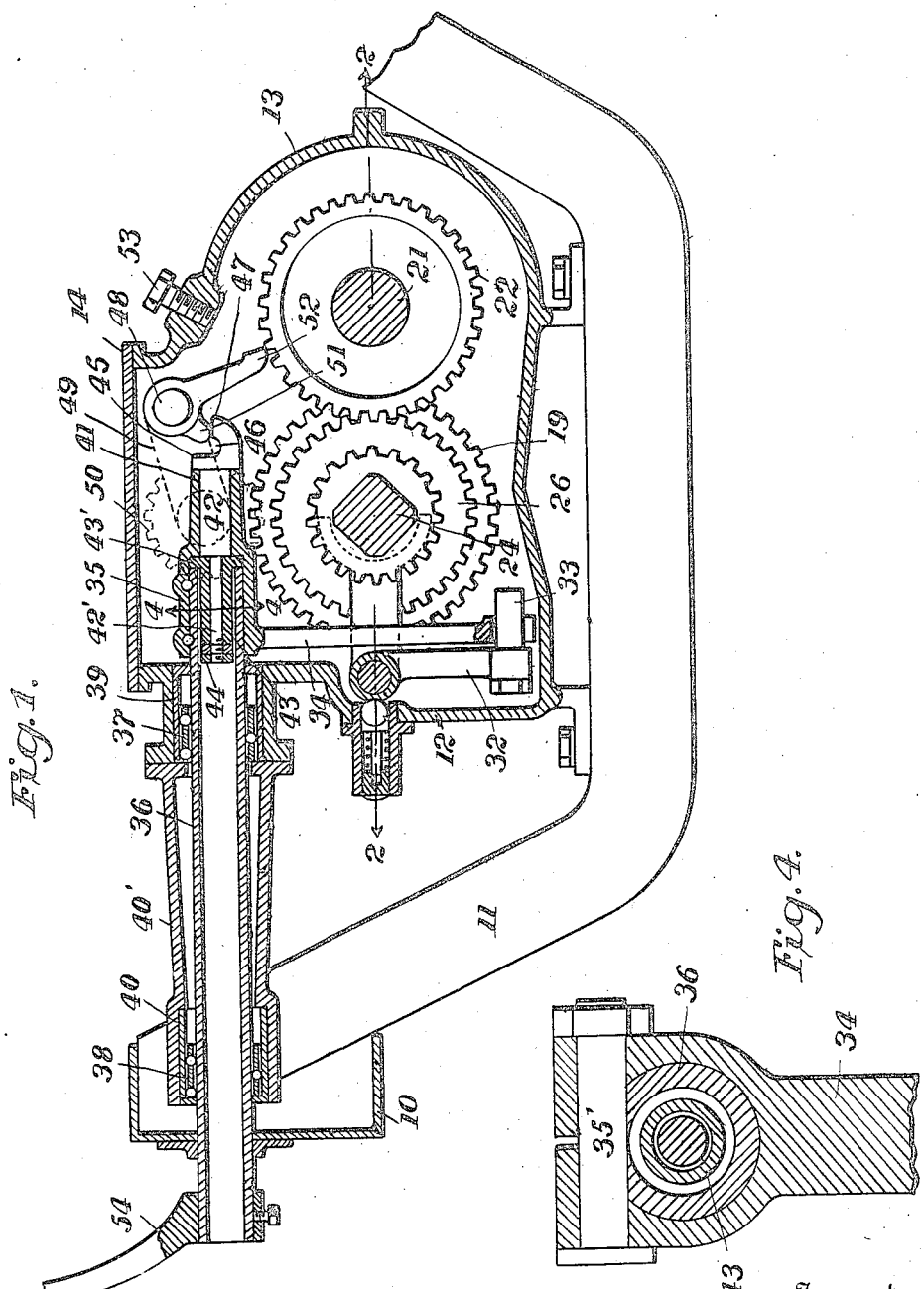
Figure 2:
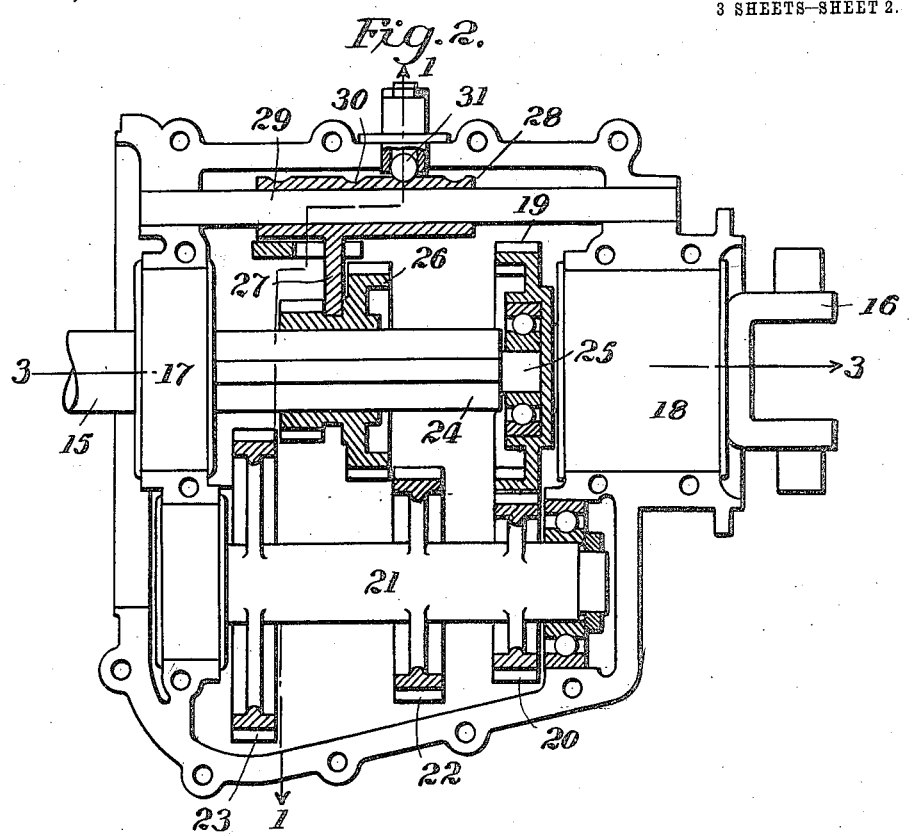
Figure 3:
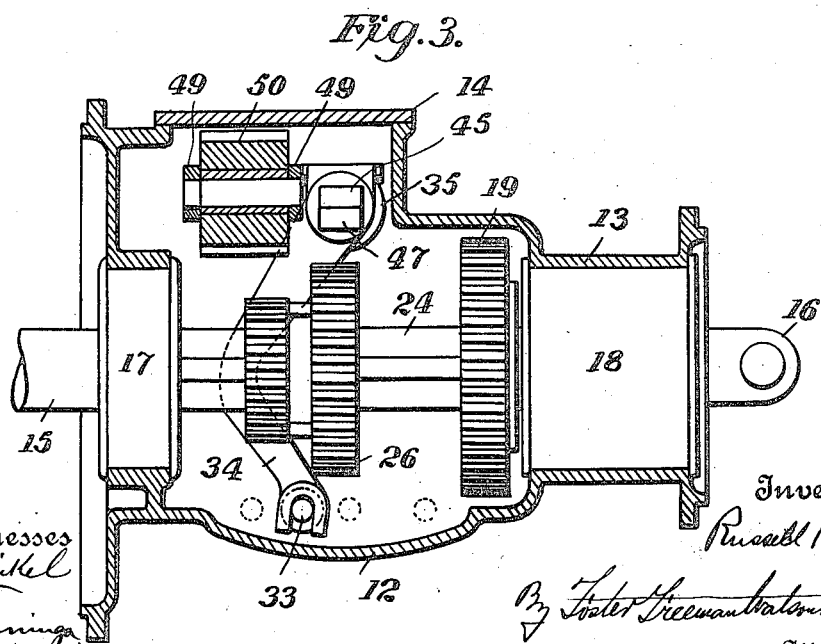

In the drawings, Figure 1 is a vertical section through the gear box and operating shaft on the line 1—1, Fig. 2; Fig. 2 is a section on the line 2—2, Fig. 1; Fig. 3 is a section on the line 3—3, Fig. 2; Fig. 4 is a section on the line 4—4, Fig. 1; Fig. 5 is an elevation partly in section showing one form of operating lever; Fig. 5ᵃ is a plan view of the operating lever guide; Fig. 6 is an elevation partly in section showing another form of operating lever.

Referring to the drawings, 10 designates one of the bars of the vehicle frame and 11 designates one of the cross bars supported thereby. A casing comprising sections 12 and 13 is bolted to the cross bars 11 and provided with a cover 14. A driving shaft 15 extends into the casing and connects with the motor, while a driven shaft 16 connects with the rear axle by means of the usual universal joint and differential mechanism. The driving and driven shafts are mounted in bearings 17 and 18 in the usual manner. The driven shaft has rigidly connected thereto a gear 19 which meshes with a gear 20 upon a counter shaft 21, this counter shaft being also provided with a pair of gears 22, 23. The driving shaft 15 is provided with a squared portion 24 and a reduced portion 25 mounted in a roller bearing cage in the gear 19. A sliding sleeve 26 is provided with a pair of gears which coöperate with the gears 22, 23 and with internal teeth in the gear 19. The mechanism so far described is of known construction and its operation is well known to those skilled in the art.

The shoe 27 is mounted upon a sleeve 28 sliding upon a stationary shaft 29 mounted in the casing. This sleeve is provided with a series of recesses 30 which coöperate with a spring pressed latch 31 so as to latch the sleeve in a plurality of positions. An arm 32 extends downwardly from the sleeve 28 and is provided with a pin 33 which engages in an arm 34 rigidly connected to a fork in a split sleeve 35. This split sleeve is rigidly connected to a hollow operating shaft 36 by means of bolts 35', as shown in Fig. 4. The shaft 36 is mounted for rocking and endwise movement in its bearings. These bearings comprise roller cages 37 and 38 mounted for endwise and rotative movement in the sleeves 39 and 40, the sleeve 40 being mounted in an extension 40' bolted to the main gear casing.

The sleeve 35 has formed thereon an extension 41. A shank 42 is mounted in this extension and is provided with a reduced portion 42' upon which a sleeve 43 is clamped by nuts 44. A flange 43' on the sleeve 43 prevents endwise movement of the shank 42 relative to the sleeve 35 when the latter is secured on the shaft 36, but the construction permits relative rotation of the shank 42 and shaft 36. The shank 42 has formed thereon a head 45 provided with a recess 46 and a straight portion 47. A shaft 48 is mounted in bearings in the gear casing and has mounted thereon a pair of arms 49 which support the reverse gear 50. The shaft 48 has also secured thereto a lug 51 which is adapted to engage the recess 46 and the straight portion 47, in a manner hereafter to be described, and an arm 52 which is adapted to engage an adjustable stop 53.

The operating shaft has rigidly secured thereto an operating lever 54 which is guided in its movements by means of the side members 55, 56 of the operating lever guide. This operating lever guide, which is illustrated in Fig. 5ª, is of the same construction as that shown in my prior application Serial No. 494,455, filed May 6, 1909. One of the side members has formed therein a recess 57 which permits the operating lever to be moved inwardly. The guide is mounted upon a bracket 58 secured to the frame of the vehicle. As described in the application referred to, the position of the operating lever shown in Fig. 5 corresponds to the neutral position of the gears shown in Figs. 1, 2 and 3.

By moving the lever forwardly, the shaft 36 will be rocked to move the sleeve 26 so as to mesh the gears thereon successively with the gear 22 on the counter shaft 21 and with the internal teeth on the gear 19, the positions corresponding to the intermediate speed and direct drive. In order to obtain the low speed, the operating lever is moved backwardly so as to rock the shaft and move the sleeve 26 and the gear thereon to mesh with the gear 23. During this movement of the operating lever, the reverse gear is maintained in inoperative position, as shown in dotted lines in Fig. 1 and in full lines in Fig. 3, by the engagement of the lug 51 with the straight portion 47. The connection between the shank 42 and the shaft 36 allows free rotative movement of the shaft. In order to obtain the reverse drive the operating lever is moved to neutral position and then inwardly into the recess 57. In this position the sleeve 26 will be in neutral position, as shown in Fig. 2 and the shaft 36 will be moved axially. The axial movement of the shaft and the head 45 will cause the lug 51 to drop into the recess 46 and thereafter the wall of the recess will engage the lug and move the reverse gear 50 into engagement with the gear 23 on the counter shaft and the gear on the sleeve 26.

Referring to Fig. 6 which shows a slightly modified form of operating lever, a sleeve 60 is rigidly connected to the shaft 36 and the operating lever straddles this sleeve and is connected thereto by means of a pivot pin 59. The operating lever has an extension 61 provided with a segment which engages a groove in a bracket 63 rigidly secured to the frame. The operation of this operating lever is substantially the same as in the form shown in Fig. 5. During the back and forth movement of the lever in the guide the segment 62 will slide in the groove, but when the operating lever is moved transversely into the recess 57, the lever will swing about the segment 62 as an axis and move the shaft 36 inwardly.

It will be obvious that various changes may be made in the details of construction without departing from this invention and it is therefore to be understood that this invention is not to be limited to the specific construction shown.

Having described my invention what I claim as new and desire to secure by Letters-Patent is, 1. In transmission gearing, the combination with change speed and reverse gears; of a shaft connected to said gears and adapted to rock to shift the change speed gears and to slide axially to rock the reverse gear, and means movable with said shaft for rocking and sliding the same.

2. In transmission gearing, the combination with change speed and reverse gears, of a shaft connected to said gears and adapted to rock to shift the change speed gears and to slide axially to rock the reverse gear, a lever directly connected to said shaft for operating the same and arranged to move in the same direction as the shaft, and a guide for said lever constructed to prevent transverse movement of said lever during change speed movement and longitudinal movement of said lever during reverse movement.

3. In transmission gearing, the combination with change speed and reverse gears, of a shaft connected to said gears and adapted to rock to shift the change speed gears to different positions and manually operable to slide axially in opposite directions to rock the reverse gear, a lever directly connected to the shaft and movable therewith for rocking and sliding said shaft, and a guide for said lever, said lever moving longitudinally of said guide to rock said shaft and transversely of said guide to slide said shaft.

4. In transmission gearing, the combination with change speed and reverse gears, of a shaft connected to all of said gears and adapted to rock to shift the change speed gears and to slide axially to operate the reverse gear, means for rocking and sliding said shaft, and means for locking said reverse gear in inoperative position during the rocking movement of said shaft.

5. In transmission gearing, the combination with a support, alined driving and driven shafts, a counter shaft, gears on said shafts some of which are movable thereon to effect various speeds, and a pivotally supported reversing gear, of an operating shaft mounted in said support transversely of said gear shafts, connections by which a rocking movement of said operating shaft effects the operation of said movable speed gears, and connections by which an endwise movement of said operating shafts effects the operation of said reverse gear.

6. In transmission gearing, the combination with change speed and reverse gears, of a shoe for shifting the change speed gears, a rocking and endwise movable shaft, an arm rigidly connected to said shaft and engaging said shoe so as to move the same when the shaft is rocked, and connections whereby the reverse gear is operated when said shaft is moved endwise.

7. In transmission gearing, the combination with change speed and reverse gears, of a rocking and endwise movable shaft, connections whereby the change speed gears are shifted when said shaft is rocked, a hanger for the reverse gear, and a head on the end of said shaft engaging the hanger, and constructed to permit free rotative movement of said shaft.

8. In transmission gearing, the combination with change speed and reverse gears, of a rocking and endwise movable shaft, connections whereby the change speed gears are shifted when said shaft is rocked, a hanger for the reverse gear, provided with a lug, and a head on the end of said shaft provided with means engaging the lug to move said hanger and lock it with the reverse gear in inoperative position.

9. In transmission gearing, the combination with change speed and reverse gears, of a rocking and endwise movable shaft, connections whereby the change speed gears are shifted when said shaft is rocked, a hanger for the reverse gear, and a head rotatably mounted in the end of said shaft and engaging said hanger.

10. In transmission gearing, the combination with change speed and reverse gears, of a rocking and endwise movable shaft, connections whereby the change speed gears are shifted when said shaft is rocked, a hanger for the reverse gear provided with a lug, and a head on the end of said shaft provided with means engaging the lug to move said hanger and lock it with the reverse gear in inoperative position, said head being constructed to permit free rotative movement of said shaft.

11. In transmission gearing, the combination with change speed and reverse gears, of a rocking and endwise movable shaft, connections whereby the change speed gears are shifted when said shaft is rocked, a hanger for the reverse gear, a head on the end of said shaft engaging the hanger, and constructed to permit free rotative movement of said shaft, and an adjustable stop for limiting the movement of said hanger to operative position.

12. In transmission gearing, the combination with change speed and reverse gears, and a casing inclosing all of said parts, of a shaft connected to said gears and projecting from the casing, said shaft adapted to rock to operate one of said gears and to slide to operate another of said gears, and an operating lever mounted on said shaft outside of the casing and adapted to rock and slide said shaft.

13. In transmission gearing, the combination with change speed and reverse gears, and a casing inclosing all of said parts, of a shaft connected to said gears and projecting from the casing, said shaft adapted to rock to shift the change gear, and to slide to operate the reverse gear, and a hand lever mounted on said shaft outside of the casing and adapted to rock and slide said shaft.

14. In transmission gearing, the combination with change speed and reverse gears, and a casing inclosing all of said parts, of a shaft connected to said gears and projecting from the casing, said shaft adapted to rock to shift the change speed gears, and to slide to operate the reverse gear, a hand lever mounted on said shaft outside of the casing and adapted to rock and slide said shaft, and a guide for the hand lever, the lever moving longitudinally of the guide to rock said shaft and transversely of the guide to slide said shaft.

15. In transmission gearing, the combination with a reverse gear, of a hanger therefor adapted to move with said gear to operative and inoperative positions, and provided with a lug, an endwise movable operating shaft, and a head on said shaft provided with a recess and a raised portion, said lug engaging said recess and said raised portion when said gear is in operative and inoperative positions respectively.

16. In transmission gearing, the combination with speed and reverse gears, of a hanger for said reverse gear provided with a lug, a rocking and endwise movable shaft connected to said gears adapted to rock to operate said speed gears and move endwise to operate said reverse gear, and a head on said shaft provided with a recess and a raised portion, said lug engaging said recess and raised portion when said reverse gear is in operative and inoperative positions respectively, the engagement between said lug and head permitting free rotative movement of said shaft.

17. In transmission gearing, the combination with a reverse gear, of a hanger therefor adapted to move with said gear to operative and inoperative positions, and provided with a lug, an endwise movable operating shaft, and a head on said shaft provided with means engaging said lug to move said gear to operative and inoperative positions and to lock said gear in inoperative position.

18. In transmission gearing, the combination with change speed and reverse gears, of a rocking and endwise movable shaft, connections whereby the change speed gears are shifted when said shaft is rocked, a hanger for the reverse gear, and a head on the end of said shaft engaging the hanger and constructed to maintain its engagement with the hanger while permitting free rotative movement of the shaft.

19. In transmission gearing, the combination with a gear, a hanger therefor adapted to move said gear to operative and inoperative positions, and provided with a lug, of an endwise movable operating shaft, and a head on said shaft provided with a recess and a raised portion, said lug engaging said recess and said raised portion when said gear is in operative and inoperative positions respectively.

20. In transmssion gearing, the combination with a gear, a hanger therefor adapted to move said gear to operative and inoperative positions, and provided with a lug, of an endwise movable shaft, and a head on said shaft provided with means engaging said lug to move said gear to operative and inoperative positions and to lock said gear in inoperative position.

In testimony whereof I affix my signature in presence of two witnesses.

RUSSELL HUFF.

Witnesses:
E. N. HEARN,
F. M. BRANIGAN.